(12) United States Patent
Yandrasits et al.

(10) Patent No.: US 8,921,002 B2
(45) Date of Patent: Dec. 30, 2014

(54) MANUFACTURING OF FUEL CELL MEMBRANE ELECTRODE ASSEMBLIES INCORPORATING PHOTOCURABLE CATIONIC CROSSLINKABLE RESIN GASKET

(71) Applicant: 3M Innovative Properties Company, St. Paul, MN (US)

(72) Inventors: Michael A. Yandrasits, Hastings, MN (US); Michael T. Hicks, Bend, OR (US); Daniel M. Pierpont, North St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/848,093

(22) Filed: Mar. 21, 2013

(65) Prior Publication Data
US 2013/0216932 A1 Aug. 22, 2013

Related U.S. Application Data

(62) Division of application No. 11/962,848, filed on Dec. 21, 2007, now Pat. No. 8,426,078.

(51) Int. Cl.
*H01M 8/10* (2006.01)
*H01M 2/08* (2006.01)
*B32B 38/00* (2006.01)
*H01M 8/02* (2006.01)
*H01M 8/24* (2006.01)

(52) U.S. Cl.
CPC .......... *H01M 8/1002* (2013.01); *H01M 8/0271* (2013.01); *H01M 8/0284* (2013.01); *H01M 8/0286* (2013.01); *H01M 8/242* (2013.01); *H01M 2008/1095* (2013.01); *Y02E 60/523* (2013.01); *Y02E 60/50* (2013.01)
USPC .......... 429/483; 429/509; 156/273.3

(58) Field of Classification Search
None
See application file for complete search history.

(56) References Cited

U.S. PATENT DOCUMENTS

| 4,812,352 A | 3/1989 | Debe |
| 5,879,827 A | 3/1999 | Debe et al. |

(Continued)

FOREIGN PATENT DOCUMENTS

| EP | 1 804 325 | 7/2007 |
| WO | 00/10216 | 2/2000 |
| WO | WO 0010216 A1 * | 2/2000 |
| WO | 2006/075867 | 7/2006 |

OTHER PUBLICATIONS

Crivello, The discovery and development of onium salt cationic photoinitiators, Aug. 1999, J. Polym. Sci Part A, 37, 4241-4254.*

(Continued)

*Primary Examiner* — Ula C. Ruddock
*Assistant Examiner* — Daniel Gatewood
(74) *Attorney, Agent, or Firm* — Julie Lapos-Kuchar; Gregory D. Allen (57) ABSTRACT

A first transport system moves a web comprising a subgasketed CCM layer and an application system applies a crosslinkable resin to at least a subgasketed portion of the subgasketed CCM layer. The crosslinkable resin preferably comprises a photocurable cationic crosslinkable resin. A first curing apparatus subjects an exposed surface of the crosslinkable resin to a photo curing process to initiate curing of the crosslinkable resin. A second transport system moves a GDL into adhering contact with a partially cured exposed surface of the crosslinkable resin of the CCM layer so as to form an MEA layer. A second curing apparatus subjects the GDL, partially cured crosslinkable resin, and CCM layer structure to a thermal curing process to substantially complete curing of the crosslinkable resin. A converting system is configured to receive the MEA layer and produce a plurality of discrete MEAs from the MEA layer.

6 Claims, 8 Drawing Sheets

(56) References Cited

U.S. PATENT DOCUMENTS

| | | |
|---|---|---|
| 6,136,412 A | 10/2000 | Spiewak et al. |
| 2003/0221311 A1 | 12/2003 | Smith et al. |
| 2006/0078781 A1 | 4/2006 | Stegink et al. |
| 2007/0059452 A1 | 3/2007 | Debe et al. |
| 2007/0175584 A1 | 8/2007 | Merlo et al. |
| 2007/0196718 A1 | 8/2007 | Leistra et al. |
| 2008/0020923 A1 | 1/2008 | Debe et al. |

OTHER PUBLICATIONS

J. Crivello, "The Discovery and Development of Onium Salt Cationic Photoinitiators", *Journal of Polymer Science: Part A: Polymer Chemistry*, vol. 37, pp. 4241-4254, 1999.

\* cited by examiner

MANUFACTURING OF FUEL CELL MEMBRANE ELECTRODE ASSEMBLIES INCORPORATING PHOTOCURABLE CATIONIC CROSSLINKABLE RESIN GASKET

FIELD OF THE INVENTION

The present invention relates generally to fuel cell assemblies and methods of assembly that employ a dual-purpose crosslinkable resin gasket of an electrode membrane assembly and, more particularly, to a photocurable cationic crosslinkable resin gasket for use in an electrode membrane assembly.

BACKGROUND OF THE INVENTION

A typical fuel cell system includes a power section in which one or more fuel cells generate electrical power. A fuel cell is an energy conversion device that converts hydrogen and oxygen into water, producing electricity and heat in the process. Each fuel cell unit may include a proton exchange member (PEM) with gas diffusion layers on either side of the proton exchange member. Anode and cathode catalyst layers are respectively positioned between the gas diffusion layers and the PEM. This unit is referred to as a membrane electrode assembly (MEA). Separator plates (also referred to herein and flow field plates or bipolar plates) are respectively positioned on the outside of the gas diffusion layers of the membrane electrode assembly. This type of fuel cell is often referred to as a PEM fuel cell.

The reaction in a single MEA typically produces less than one volt. Therefore, to obtain operating voltages useful in most applications, a plurality of the MEAs may be stacked and electrically connected in series to achieve a desired voltage. Electrical current is collected from the fuel cell stack and used to drive a load. Fuel cells may be used to supply power for a variety of applications, ranging from automobiles to laptop computers.

The efficiency of the fuel cell power system depends on the flow of reactant gases across the surfaces of the MEA as well as the integrity of the various contacting and sealing interfaces within individual fuel cells of the fuel cell stack. Such contacting and sealing interfaces include those associated with the transport of fuels, coolants, and effluents within and between fuel cells of the stack. Proper sealing of fuel cell components and assemblies within a fuel cell stack is critical to ensure efficient operation of the fuel cell system.

SUMMARY OF THE INVENTION

Embodiments of the invention are directed to fuel cell subassemblies and methods and apparatuses for manufacturing fuel cell subassemblies. Embodiments are directed to methods of making fuel cell membrane electrode assemblies via a roll-to-roll process. Methods of the invention involve transporting a web comprising a subgasketed catalyst coated membrane layer and applying a crosslinkable resin to at least a subgasketed portion of the subgasketed CCM layer. The crosslinkable resin preferably comprises a photocurable cationic crosslinkable resin. An exposed surface of the crosslinkable resin is subjected to a photo curing process to initiate curing of the crosslinkable resin. The photo exposure process is terminated while the crosslinkable resin continues to cure in a partially cured state, preferably even in the absence of additional light. A web comprising a gas diffusion layer (GDL) is transported into adhering contact with a partially cured exposed surface of the crosslinkable resin of the CCM layer so as to form an MEA layer. The GDL, partially cured crosslinkable resin, and CCM layer structure may be subjected to a thermal curing process to substantially complete curing of the crosslinkable resin. Subsequent to substantial completion of crosslinkable resin curing, discrete MEAs may be produced from the MEA layer.

Embodiments of the invention are directed to a fuel cell MEA comprising a CCM having a first surface and a second surface. The first surface of the CCM includes an anode catalyst layer and the second surface of the CCM includes a cathode catalyst layer. A subgasket is provided about a peripheral region of the CCM on the first and second surfaces. A crosslinked resin is provided on at least the subgasket of the first and second CCM surfaces. The crosslinked resin preferably comprises a photocurable cationic crosslinkable resin. A GDL is adheringly sealed to the subgasket of the first and second CCM surfaces via the crosslinked resin.

Embodiments of the invention are directed to an apparatus for producing fuel cell MEAs. An apparatus of the invention includes a first transport system configured to move a web comprising a subgasketed CCM layer and an application system configured to apply a crosslinkable resin to at least a subgasketed portion of the subgasketed CCM layer. The crosslinkable resin preferably comprises a photocurable cationic crosslinkable resin. A first curing apparatus is configured to subject an exposed surface of the crosslinkable resin to a photo curing process to initiate curing of the crosslinkable resin. A second transport system is configured to move a GDL into adhering contact with a partially cured exposed surface of the crosslinkable resin of the CCM layer so as to form an MEA layer. A second curing apparatus may be employed and configured to subject the GDL, partially cured crosslinkable resin, and CCM layer structure to a thermal curing process to substantially complete curing of the crosslinkable resin. A converting system is configured to receive the MEA layer and produce a plurality of discrete MEAs from the MEA layer.

The above summary of the present invention is not intended to describe each embodiment or every implementation of the present invention. Advantages and attainments, together with a more complete understanding of the invention, will become apparent and appreciated by referring to the following detailed description and claims taken in conjunction with the accompanying drawings.

While the invention is amenable to various modifications and alternative forms, specifics thereof have been shown by way of example in the drawings and will be described in detail. It is to be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION OF VARIOUS EMBODIMENTS

In the following description of the illustrated embodiments, reference is made to the accompanying drawings that form a part hereof, and in which is shown by way of illustration, various embodiments in which the invention may be practiced. It is to be understood that other embodiments may be utilized and structural changes may be made to the illustrated embodiments without departing from the scope of the present invention.

Embodiments of the invention are directed to a roll-to-roll manufacturing process to obtain membrane electrode assemblies that employ a crosslinkable resin that serves as both a gasket for sealing and as an adhesive for attaching a gas diffusion layer. Embodiments of the invention utilize a series of processes to coat a subgasketed catalyst coated membrane with a crosslinkable resin, partially cure the crosslinkable resin, attach a GDL to the subgasketed CCM, complete the crosslinkable resin cure, and produce discrete MEAs. Embodiments of the invention employ a crosslinkable resin that has a multi-stage curing property, wherein the crosslinkable resin remains in a partially cured state during which the crosslinkable resin is tacky, and then progresses to a fully cured stage. Crosslinkable resins particularly well suited for use in roll-to-roll manufacturing processes of the present invention include photocurable crosslinkable resins, such as photocurable cationic crosslinkable resins.

Processes of the invention find particular utility in the production of polymer electrolyte fuel cells, specifically as a means to enable high-volume, roll-to-roll manufacturing of MEAs with a crosslinkable resin gasket seal on the MEA. By utilizing the crosslinkable resin simultaneously as a seal and as an adhesive for attaching GDLs, MEAs can be manufactured via high speed, roll-to-roll processing.

Conventional MEA fabrication methodologies for attaching a GDL to a CCM typically involve cutting the CCM from a web to make a discrete part or assembling the CCM as a discrete part from piece parts. A discrete GDL is situated on both sides of a CCM and bonded to the CCM using a heated, static press. Conventional methodologies for attaching a seal to the MEA typically involve cutting the MEA from a web to make a discrete part or assembling the MEA as a discrete part from piece parts, applying the crosslinkable resin to the MEA, and curing the crosslinkable resin in a heated static, press. A significant disadvantage associated with both the conventional GDL and seal attachment approaches is that discrete part assembly is not amenable to high-volume manufacturing.

Many conventional MEA fabrication methodologies use pressure sensitive adhesives. Such pressure sensitive adhesives typically have a low glass transition temperature, which can cause the adhesive to ooze or creep during processing. Other types of adhesives that have been used in MEA fabrication employ a crosslinking polymerization mechanism. Such adhesives generally take an appreciable amount of time to set up relative to their limited pot life, thus precluding use of such adhesives in roll-to-roll fabrication methodologies. Conventional UV curable adhesives are of limited use, as the GDL blocks the UV light from impinging on the UV curable adhesive. In contrast to conventional fabrication approaches, embodiments of the invention employ an multi-stage curable crosslinkable resin that serves as both a gasket for sealing and as an adhesive for attaching a GDL, enabling production of MEAs using high speed, roll-to-roll processing.

A dual-purpose gasket of the present invention may be incorporated in fuel cell assemblies and stacks of varying types, configurations, and technologies. For example, a dual-purpose gasket of the present invention can be employed in proton exchange membrane (PEM) fuel cell assemblies. PEM fuel cells operate at relatively low temperatures, have high power density, can vary their output quickly to meet shifts in power demand, and are well suited for applications where quick startup is required, such as in automobiles for example.

Although generally illustrated herein in conjunction with PEM fuel cells, a dual-purpose gasket in accordance with embodiments of the invention may also be employed in other types of fuel cells, including direct methanol fuel cells (DMFC). Direct methanol fuel cells are similar to PEM cells in that they both use a polymer membrane as the electrolyte. In a DMFC, however, the anode catalyst itself draws the hydrogen from liquid methanol fuel, eliminating the need for a fuel reformer.

Figure 1:
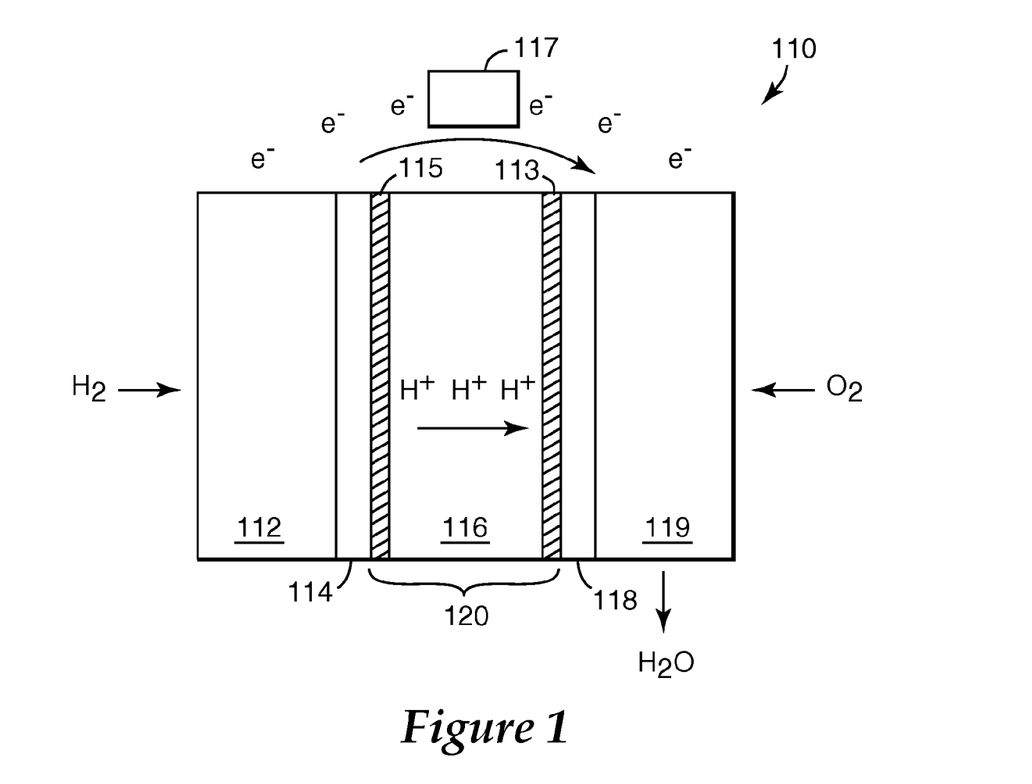
FIG. 1 is an illustration of a fuel cell and its constituent layers.

A typical proton exchange member fuel cell is depicted in FIG. 1. The fuel cell 110 shown in FIG. 1 includes a first flow field plate 112 adjacent a first gas diffusion layer (GDL) 114. Adjacent the GDL 114 is a catalyst coated membrane (CCM) 120. A second GDL 118 is situated adjacent the CCM 120, and a second flow field plate 119 is situated adjacent the second GDL 118.

In operation, hydrogen fuel is introduced into the anode portion of the fuel cell 110, passing over the first flow field separator 112 and through the GDL 114. At the interface of the GDL 114 and the CCM 120, on the surface of the catalyst layer 115, the hydrogen fuel is separated into hydrogen ions ($H^+$) and electrons ($e^-$).

The electrolyte membrane 116 of the CCM 120 permits only the hydrogen ions or protons and water to pass through the electrolyte membrane 116 to the cathode catalyst layer 113 of the fuel cell 110. The electrons cannot pass through the electrolyte membrane 116 and, instead, flow through an external electrical circuit in the form of electric current. This current can power an electric load 117, such as an electric motor, or be directed to an energy storage device, such as a rechargeable battery.

Oxygen flows through the second GDL 118 at the cathode side of the fuel cell 110 via the second flow field separator 119. On the surface of the cathode catalyst layer 113, oxygen, protons, and electrons combine to produce water and heat.

Individual fuel cells, such as the fuel cell shown in FIG. 1, can be combined to form a fuel cell stack. The number of fuel cells within the stack determines the maximum voltage of the stack, and the surface area of each of the cells determines the maximum current. The electrical power generated by a given fuel cell stack can be determined by multiplying the total stack voltage by total current.

Sealing fuels, coolants, and other fluids within each fuel cell in a stack is critical to the efficient operation of the fuel cell stack. Dual-purpose crosslinkable resin gaskets of the present invention are preferably deployed around the perimeter of the active area of the electrolyte membrane. The gaskets are critical to seal against leaks in the peripheral areas and/or edges of the electrolyte membrane and GDLs. In some configurations, a sealing system may include both dual-purpose crosslinkable resin gaskets along with other sealing arrangements.

Figure 2:
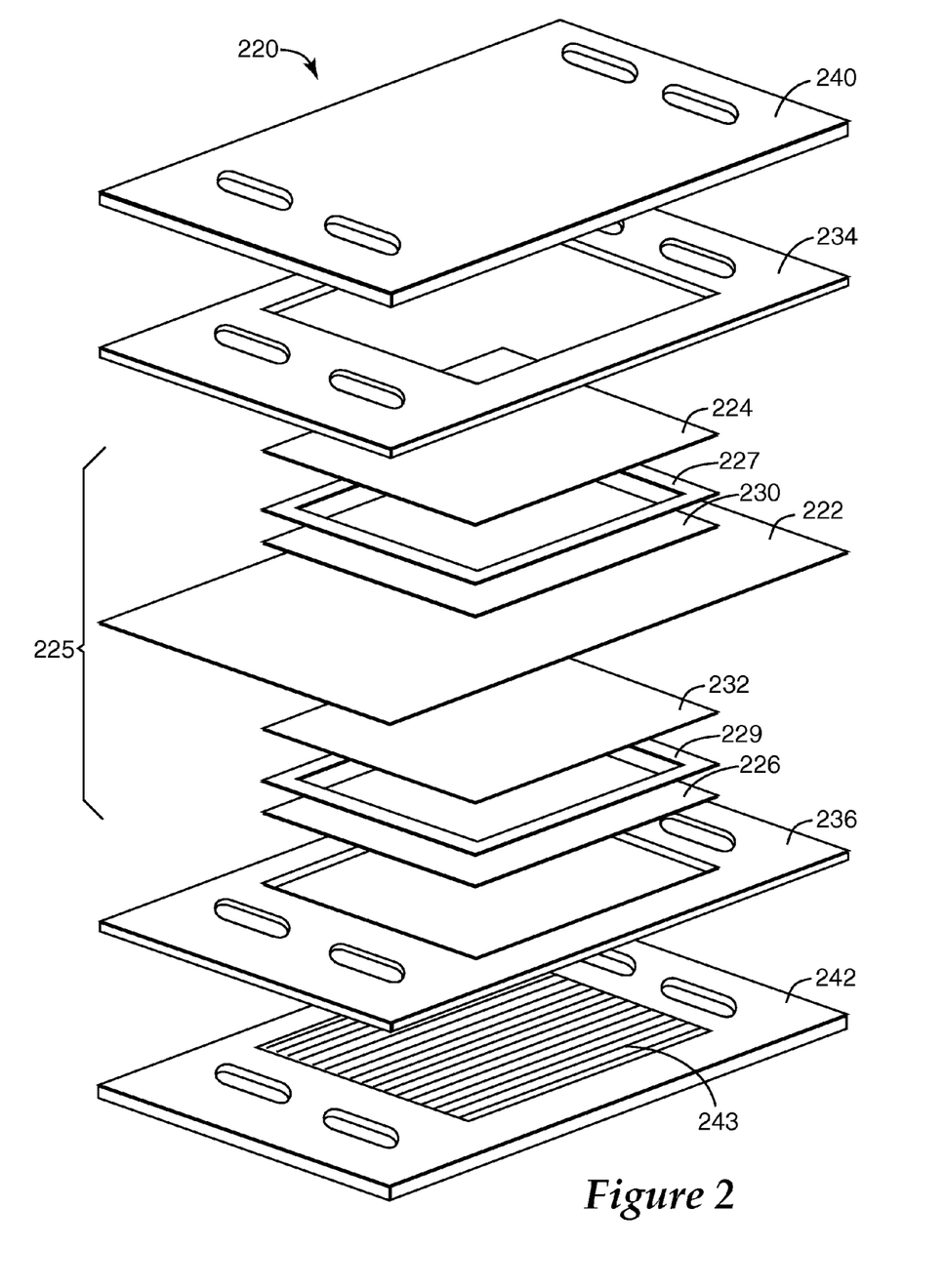
FIG. 2 provides an exploded diagram of a fuel cell including dual-purpose crosslinkable resin gaskets configured in accordance with embodiments of the present invention.

FIG. 2 shows an exploded diagram of the components of a fuel cell that includes dual-purpose gaskets in accordance with embodiments of the invention. As is shown in FIG. 2, a membrane electrode assembly (MEA) 225 of the fuel cell 220 includes five component layers. An electrolyte membrane layer 222 is sandwiched between a pair of GDLs 224 and 226. An anode catalyst layer 230 is situated between a first GDL 224 and the membrane 222, and a cathode catalyst layer 232 is situated between the membrane 222 and a second GDL 226. A dual-purpose gasket 227 is situated between GDL 224 and the membrane 222, and a dual-purpose gasket 229 is situated between GDL 226 and the membrane 222.

In one configuration, a membrane layer 222 is fabricated to include an anode catalyst coating 230 on one surface and a cathode catalyst coating 232 on the other surface. This structure is often referred to as a catalyst-coated membrane or CCM. The GDLs 224, 226 can be fabricated to include or exclude a catalyst coating. In one configuration, an anode catalyst coating 230 can be disposed partially on the first GDL 224 and partially on one surface of the membrane 222, and/or a cathode catalyst coating 232 can be disposed partially on the second GDL 226 and partially on the other surface of the membrane 222.

In the particular embodiment shown in FIG. 2, MEA 225 is shown sandwiched between a first perimeter gasket 234 and a second perimeter gasket 236. Adjacent the first and second perimeter gaskets 234 and 236 are flow field plates 240 and 242, respectively. Each of the flow field plates or separators 240, 242 includes a field of fluid flow channels 243 and ports through which hydrogen and oxygen feed fuels may pass.

In the configuration depicted in FIG. 2, flow field plates 240, 242 are configured as unipolar flow field plates, also referred to as monopolar flow field plates, in which a single MEA 225 is sandwiched therebetween. A unipolar flow field plate may comprise a separator that includes a flow field side and a cooling side. The flow field side incorporates a field of gas flow channels 243 and ports through which hydrogen or oxygen feed fuels may pass. The cooling side incorporates a cooling arrangement, such as integral cooling channels. Alternatively, the cooling side may be configured to contact a separate cooling element, such as a cooling block or bladder through which a coolant passes or a heat sink element, for example.

The edge seal systems 234, 236 provide the necessary sealing within the fuel cell to isolate the various fluid (gas/liquid) transport and reaction regions from contaminating one another and from inappropriately exiting the fuel cell 220, and may further provide for electrical isolation and/or hard stop compression control between the flow field plates 240, 242. The term "hard stop" generally refers to a nearly or substantially incompressible material that does not significantly change in thickness under operating pressures and temperatures. More particularly, the term "hard stop" refers to a substantially incompressible member or layer in a membrane electrode assembly (MEA) which halts compression of the MEA at a fixed thickness or strain.

The perimeter gaskets 234, 236, may employ one or more gaskets, sub-gaskets and/or o-rings to effect sealing of the edges of the MEA 225 and sealing between and around the MEA 225 and the flow field plates 240, 242. In one configuration, the perimeter gaskets 234, 236 include a gasket system formed from one, two or more layers of various selected materials employed to provide the requisite sealing within the fuel cell 220. Such materials include, for example, TEFLON, fiberglass impregnated with TEFLON, a variety of crosslinkable resin materials, elastomeric materials, UV curable polymeric material, surface texture material, multi-layered composite material, sealants, and silicon material. Other configurations employ an in-situ formed seal system.

Figure 3:
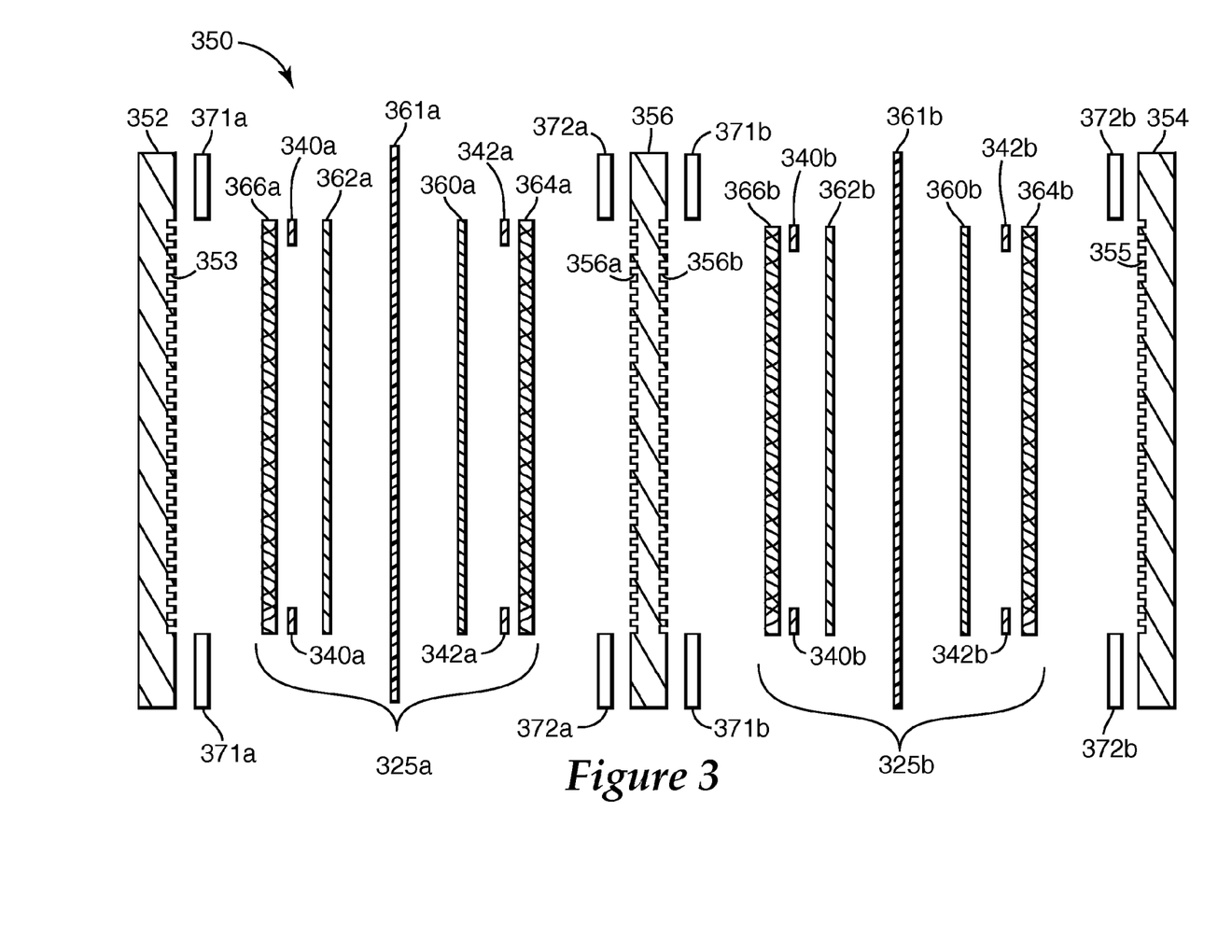
FIG. 3 provides an exploded diagram of a fuel cell stack that includes unipolar and bipolar flow field plates and dual-purpose crosslinkable resin gaskets configured in accordance with embodiments of the invention.

In certain embodiments, a fuel cell stack may use bipolar flow field plates, as illustrated in FIG. 3. FIG. 3 illustrates a fuel cell stack 350 which incorporates multiple MEAs 325 through employment of unipolar flow field plates 352, 354 and one or more bipolar flow field plates 356. In the configuration shown in FIG. 3, a two-cell stack 350 incorporates two MEAs 325a and 325b and a single bipolar flow field plate 356. MEA 325a includes a cathode 362a/membrane 361a/anode 360a layered structure sandwiched between GDLs 366a and 364a. A dual-purpose gasket 340a/342a is disposed between the cathode 362a/GDL 366a and anode 360a/GDL 364a. GDL 366a is situated adjacent a flow field end plate 352, which is configured as a unipolar flow field plate. GDL 364a is situated adjacent a first flow field surface 356a of bipolar flow field plate 356. A perimeter gasket arrangement 371a is deployed to provide sealing for MEA 325a and flow field end plate 352. Perimeter gasket arrangement 372a is deployed to provide sealing for MEA 325 and bipolar flow field plate 356.

Similarly, MEA 325b includes a cathode 362b/membrane 361b/anode 360b layered structure sandwiched between GDLs 366b and 364b. A dual-purpose gasket 340b/342b is disposed between the cathode 362b/GDL 366b and anode 360b/GDL 364b. GDL 364b is situated adjacent a flow field end plate 354, which is configured as a unipolar flow field plate. GDL 366b is situated adjacent a second flow field surface 356b of bipolar flow field plate 356. Perimeter gasket arrangements 371b and 372b are deployed to provide sealing for MEA 325b and flow field end plate 354 and MEA 325 and bipolar flow field plate 356, respectively.

The fuel cell and/or stack configurations shown in FIGS. 2 and 3 are representative of two particular arrangements that can be implemented for use in the context of the present invention. These arrangements are provided for illustrative purposes only, and are not intended to represent all possible configurations coming within the scope of the present invention. Rather, FIGS. 2 and 3 are intended to illustrate various components that can be selectively incorporated into fuel cell assemblies that include dual-purpose crosslinkable resin gaskets according to principles of the present invention.

Figure 4A:
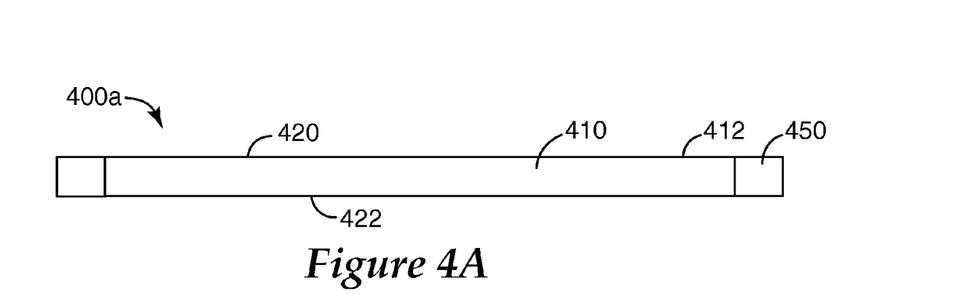
FIG. 4A-4F are cross sectional schematics of an MEA employing a crosslinkable resin gasket at various stages of fabrication in accordance with embodiments of the invention.
Figure 4B:
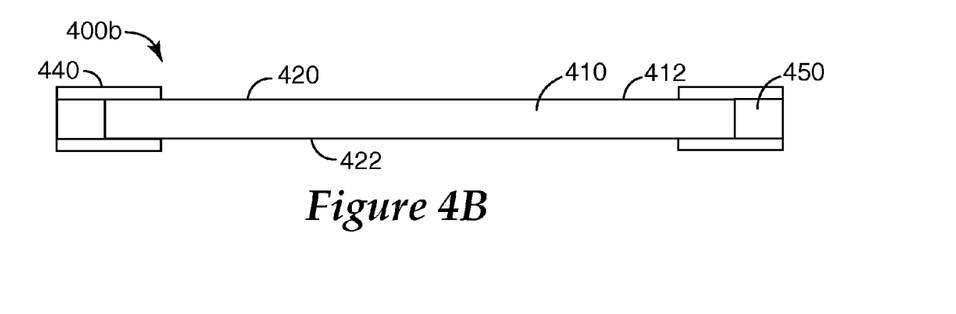
Figure 4C:
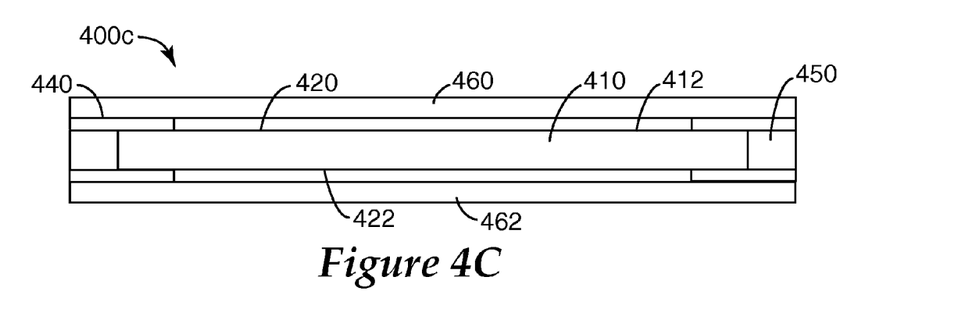

FIG. 4A-4C are cross sectional schematics of an MEA employing a dual-purpose crosslinkable resin gasket at various stages of fabrication in accordance with embodiments of the invention. FIG. 4A shows an MEA substructure 400a that includes a catalyst coated membrane 410 provided with a subgasket 450. The CCM 410 provided with subgasketed 450 is referred to herein as a subgasketed CCM 412. The CCM 410 includes an anode catalyst layer 420 and a cathode catalyst layer 422. The subgasketed CCM 412 is preferably fabricated as a web and processed to produce an MEA web using a roll-to-roll process.

Figure 4D:
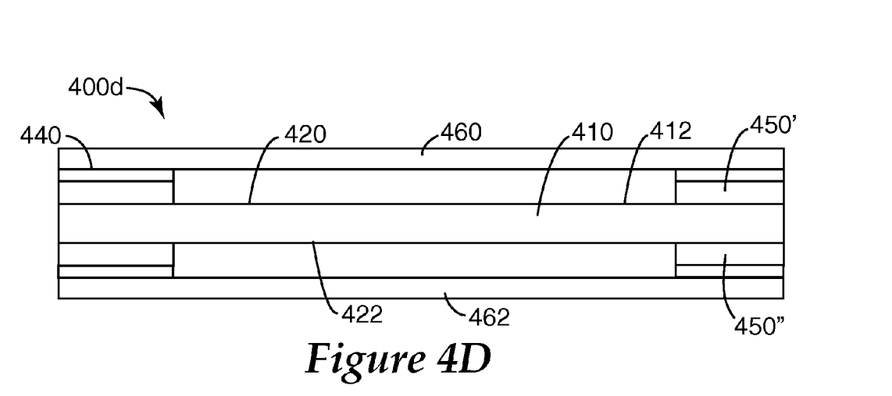
Figure 4E:
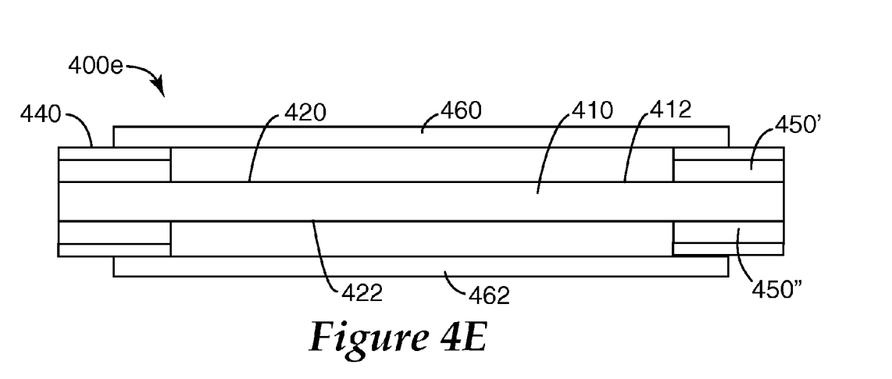
Figure 4F:
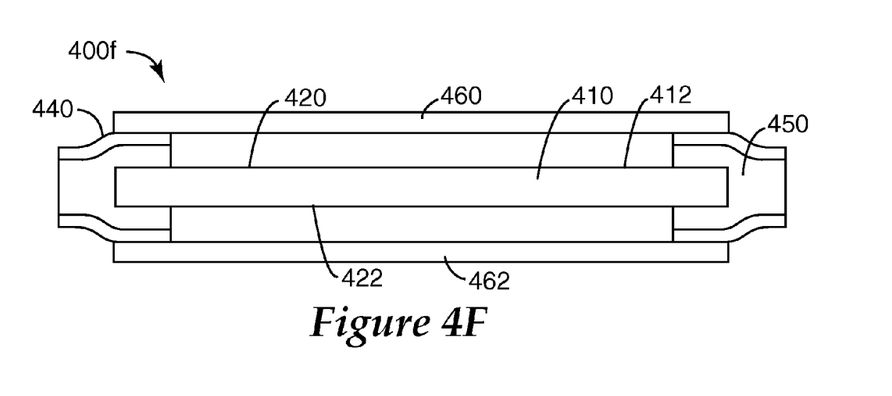

The MEA substructure 400b shown in FIG. 4B includes a crosslinkable resin 440 provided over at least the subgasketed portion of the subgasketed CCM 410. The crosslinkable resin 440 is preferably disposed over the subgasket 450 and a portion of the peripheral region of the CCM 440. The crosslinkable resin 440 serves as a dual-purpose gasket within the MEA. The crosslinkable resin 440 serves as a seal for the CCM 410 and as an adhesive to facilitate attachment of the gas diffusion layer 460 to the subgasketed CCM 410 during MEA fabrication. FIG. 4C shows gas diffusion layer 460 in adhering contact with the subgasketed CCM 410 via crosslinkable resin 440. The substructure 400c defines an MEA that incorporates the dual-purpose crosslinkable resin gasket 440. The substructures 400d, 400e, and 400f illustrated in FIGS. 4D, 4E, and 4F, respectively, show various configurations of an MEA that incorporates a dual-purpose crosslinkable resin gasket 440.

The crosslinkable resin shown in the Figures is preferably one that has sufficient latency in terms of curing duration suitable for MEA substructure fabrication in accordance with the present invention. Suitable crosslinkable resins include those that can be employed in an MEA substructure fabrication process while in a partially cured state. In particular, suitable crosslinkable resins include those that, when in a partially cured state, are sufficiently tacky to serve as an adhesive during an MEA substructure fabrication process and, when cured, serve as a seal in the fabricated MEA substructure. Suitable crosslinkable resins include those that have a multi-stage curing property, wherein the crosslinkable resin remains in a partially cured state during which the crosslinkable resin is workable and tacky, and then progresses to a fully cured stage.

In some embodiments, the crosslinkable resin is photocurable, whereby curing of the crosslinkable resin is initiated by exposure to an appropriate light source ("light" reaction), such as an ultraviolet light source, and then progresses after removing the crosslinkable resin from the light source ("dark" reaction). In some embodiments, the crosslinkable resin is photocurable and thermally curable, whereby curing of the crosslinkable resin is initiated by exposure to an appropriate light source and then accelerated (or decelerated) by adjusting the temperature of the crosslinkable resin (e.g., the ambient temperature surrounding the crosslinkable resin).

One such crosslinkable resin is based on the reaction of a commercially available epoxy and polyol resins with a triaryl sulfonium salt initiator. Resins based on the diglycidylether of bisphenol A (DGEBA) such as Epon 828 or Epon 1001F obtained from Shell Chemical Company and polyols based on polycaprolatone such as Tone 301 obtained from Union Carbide can be used in accordance with embodiments of the invention. Other suitable crosslinkable resins include monomers that are polymerizable by a cationic mechanism. Examples of such crosslinkable resins include photocurable cationic crosslinkable resins, such as polymerizable epoxide monomers (aromatic and cycloaliphatic based resins) and vinyl ether monomers. Further details about these and other suitable crosslinkable resins are provided in J. Crivello, "The Discovery and Development of Onium Salt Cationic Photoinitiators," Journal of Polymer Science: Part A: Polymer Chemistry, Vol. 37, 4241-4254 (1999).

The subgasketed CCM 412 is preferably formed as a roll good web. The subgasketed CCM 412, as shown in FIGS. 4A-4F, includes one or more subgaskets 450, 450', 450" arranged on surfaces of the CCM 412 and may include an adhesive layer, such as a pressure sensitive, thermally or UV activated adhesive layer, therebetween. For example, the adhesive layer may comprise any of the following: acrylic PSA's, rubber based adhesives, ethylene maleic anhydride copolymers, olefin adhesives such as copolymers of 1-octene with ethylene or propylene, nitrile based adhesives, epoxy based adhesives, and urethane based adhesives. In other embodiments, the adhesive layer may comprise a thermally activated adhesive, such as Thermobond 845 (polyethylene maleate based) and Thermobond 583 (nitrile rubber based).

The subgaskets 450, 450', 450" may comprise various types of polymer material, such as polyester, polyimide, polyethylene naphthalate (PEN), polyethylene telephthalate (PET) and/or other similar materials, including rigid polymeric materials that are sufficiently thin, sufficiently strong, and sufficiently compatible with the fuel cell environment, i.e., temperatures of 60-120° C., in the presence of water, hydrogen and/or oxygen. Layers of the subgaskets 450, 450', 450" need not have identical characteristics. The characteristics of the subgasket layers may be selected to facilitate component handling or fuel cell operation.

Roll good webs used in the formation of fuel cell components, such as MEAs and MEA subassemblies, can be produced as a roll good output from roll good input materials (e.g., webs of fuel cell components) in accordance with embodiments of the present invention. For example, roll good gasketed electrolyte membrane webs, roll good gasketed CCM webs, and/or roll good gasketed MEA webs can be fabricated using a continuous assembling approach by which roll good input web materials are processed to produce a roll good output web. Output fuel cell component webs can be wound with appropriate liner material to form a roll. In another approach, the fuel cell web can be converted into individual MEAs in a subsequent step.

Figure 5:
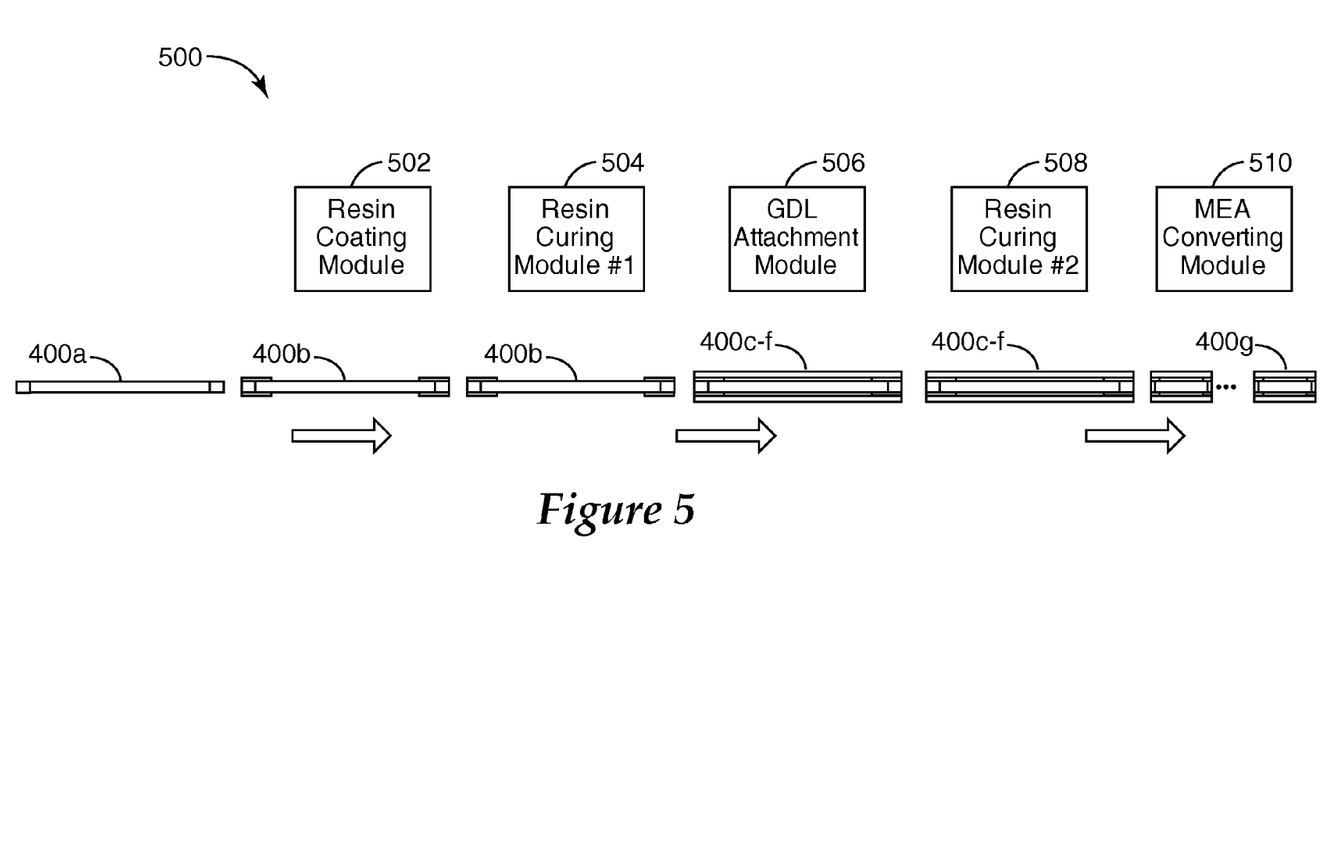
FIG. 5 is a block diagram of an apparatus for producing an MEA web and discrete MEAs from the MEA web fabricated in accordance with a roll-to-roll process according to embodiments of the invention.

FIG. 5 is a block diagram of an apparatus 500 for producing an MEA web and discrete MEAs from the MEA web fabricated in accordance with a roll-to-roll process according to embodiments of the invention. A subgasketed CCM substructure 400a, typically provided as a roll good to the apparatus 500, is transported to a crosslinkable resin coating module 502. At the crosslinkable resin coating module 502, a layer of a crosslinkable resin is applied to the subgasketed CCM substructure 400a. The crosslinkable resin is preferably applied to cover at least the subgasketed portion of the subgasketed CCM substructure 400a. The crosslinkable resin is preferably of a type described hereinabove, such as a photocurable cationic crosslinkable resin. Various processes may be used to apply the crosslinkable resin to the subgasketed CCM substructure 400a at the crosslinkable resin coating module 502. A suitable approach involves use of a rotary screen printing process to apply the crosslinkable resin to the subgasketed CCM substructure 400a, such as the process described U.S. Patent Publication 2006/0078781 which is incorporated herein by reference.

Following application of the crosslinkable resin to the subgasketed CCM substructure 400a, the substructure 400b is transported to a first resin curing module 504. At the first resin curing module 504, curing of the crosslinkable resin is initiated but not completed. Rather, the crosslinkable resin applied to the subgasketed CCM substructure 400a exits the first resin curing module 504 in a partially cured state. The crosslinkable resin preferably continues to cure even in the absence of light subsequent to the subgasketed CCM substructure 400a exiting the first resin curing module 504 in the partially cured state. The crosslinkable resin remains workable and serves as an adhesive while in the partially cured state.

According to some embodiments, the crosslinkable resin comprises a photocurable cationic crosslinkable resin that is exposed to UV light at the first resin curing module 504. A typical dose of UV light ranges from about 5 mJ/cm$^2$ to about 5 J/cm$^2$. Doses can be varied by varying the linespeed of the UV processor. Treatment of the crosslinkable resin at the first resin curing module 504 should leave the crosslinkable resin sufficiently tacky so that a GDL can be attached to the subgasketed CCM substructure 400a via adhering contact between the GDL and the crosslinkable resin. As is shown in FIG. 5, the GDL is attached to the subgasketed CCM substructure 400a at a GDL attachment module 506. The substructure exiting the GDL attachment module 506 defines an MEA, such as the MEA substructures 400c-f shown in FIGS. 4A-4F.

The MEA substructure 400c-f is advanced to a second resin curing module 508, where the crosslinkable resin is subjected to additional curing. The second resin curing module 508 may provide thermal curing, for example. It is understood that additional UV curing of the MEA substructure 400c-f is not possible due to the presence of the light blocking GDL. Hence, an additional form of curing may be needed to complete curing of the crosslinkable resin. The crosslinkable resin is preferably subjected to thermal curing at the second resin curing module 508 to complete curing of the crosslinkable resin. A typical duration of thermal curing ranges from about 1 minute to about 1 day.

In some embodiments, the apparatus 500 need not include a second resin curing module 508 depending on the particular formulation of the crosslinkable resin. For example, the rate of crosslinkable resin curing after initiation at the first resin curing module 504 may allow for GDL attachment and substantially complete curing thereafter within an acceptable amount of time. For high volume roll-to-roll processes, however, it is believed desirable to include an additional curing module to facilitate accelerated curing of the crosslinkable resin. The web of MEA substructures 400c-f may be converted to discrete MEAs 400g at an MEA converting module 510. The MEA converting module 510 may include a rotary die cutter, a laser cutter, or a die press, for example.

Figure 6:
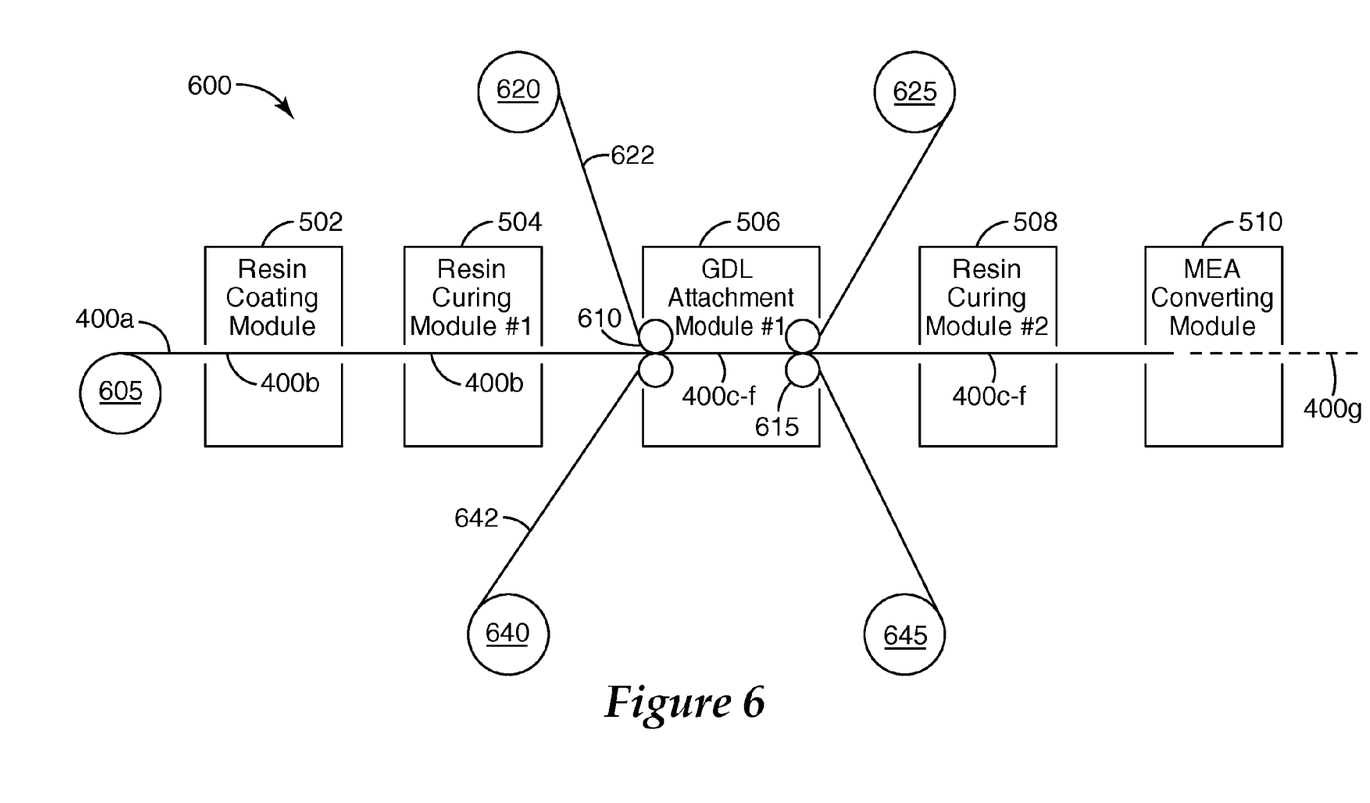
FIG. 6 shows an apparatus for producing an MEA web and discrete MEAs from the MEA web fabricated in accordance with a roll-to-roll process according to embodiments of the invention.

FIG. 6 shows an apparatus for producing an MEA web and discrete MEAs from the MEA web fabricated in accordance with a roll-to-roll process according to embodiments of the invention. A web of subgasketed CCM substructure 400a is transported from a supply roll 605 to a crosslinkable resin coating module 502. At the crosslinkable resin coating module 502, which may include a rotary screen printer, a crosslinkable resin is applied to cover at least the subgasketed portion of the subgasketed CCM substructure 400a. The web is advanced so that the CCM substructure 400a is transported to a first resin curing module 504, where curing of the crosslinkable resin is initiated but not completed.

The web is advanced so that the subgasketed CCM substructure 400b provided with the partially cured crosslinkable resin is advanced to a GDL attachment module 506. A GDL web 622 is transported from a supply roll 620 and is moved into adhering contact with the subgasketed CCM substructure 400b via rollers 610 at the GDL attachment module 506. As was discussed previously, the partially cured crosslinkable resin remains sufficiently tacky so that the GDL adheres to the subgasketed CCM substructure 400b. In some configurations, the GDL web, after being brought into adhering contacting with the subgasketed CCM substructure 400b at the GDL attachment module 506, travels with the subgasketed CCM substructure web and exits the GDL attachment module 506 for further processing. In other configurations, the GDL web may include a release liner. A stripper arrangement 615 may be used to separate the GDL from the release liner. A roll 625 may be used to take up the release liner.

In some embodiments, the apparatus 600 shown in FIG. 6 may be configured to process both surfaces of the subgasketed CCM substructure 400b substantially concurrently. In such embodiments, the apparatus 600 employs a second GDL web transport mechanism that includes a supply roll 640 that supplies a GDL web to the GDL attachment module 506. An optional take-up roll 645 may be employed depending on the apparatus implementation as discussed above. In other embodiments, a first surface of the subgasketed CCM substructure 400b is processed followed by processing of the second surface of the subgasketed CCM substructure 400b by the apparatus 600. In such embodiments, the second GDL web transport mechanism would not be needed.

The substructure exiting the GDL attachment module 506 defines an MEA, such as the MEA substructures 400c-f shown in FIGS. 4A-4F. The web of MEA substructures 400c-f is advanced to a second resin curing module 508, where the crosslinkable resin is subjected to additional curing, preferably thermal curing. The web of MEA substructures 400c-f may be converted to discrete MEAs 400g at an MEA converting module 510, which may include a rotary die cutter, a laser cutter, or a die press, for example.

Figure 7:
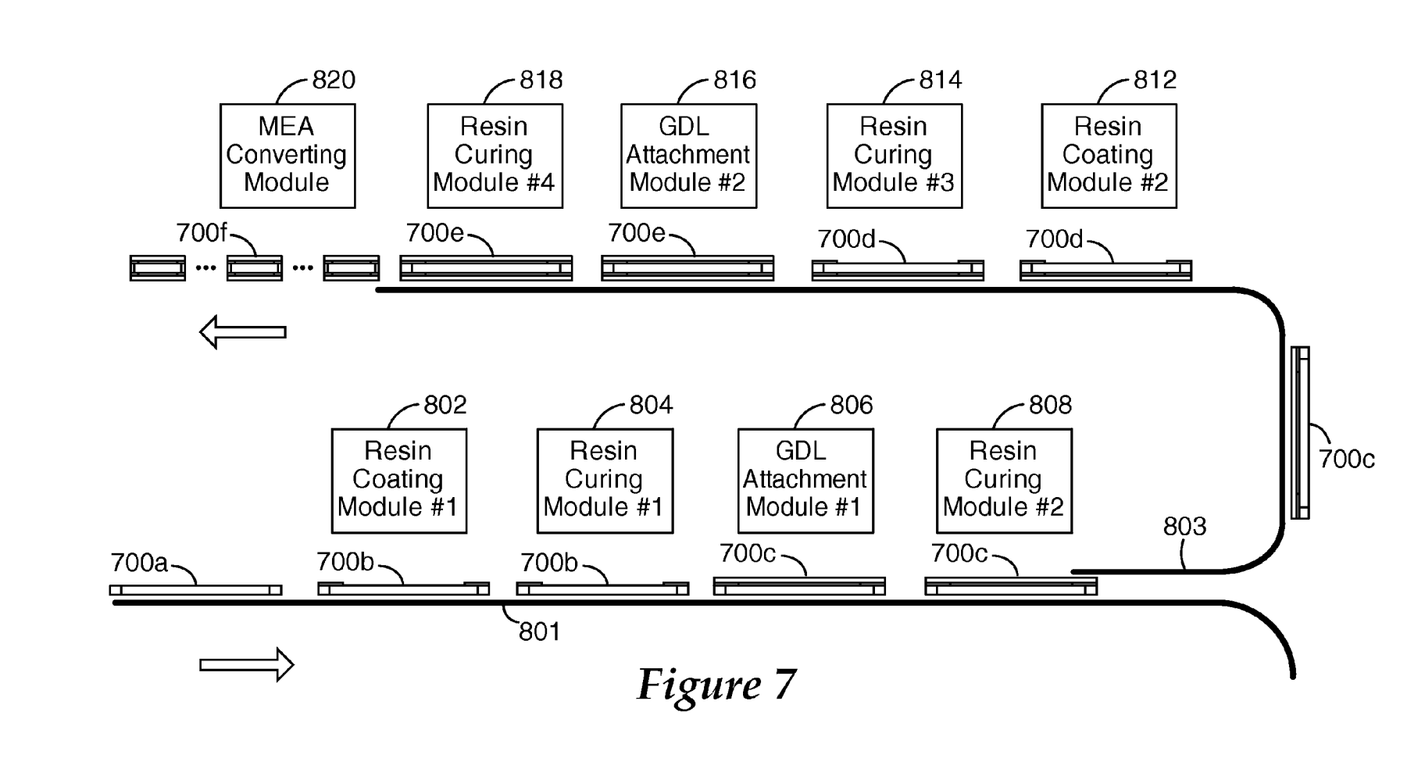
FIG. 7 shows an apparatus for producing an MEA web and discrete MEAs from the MEA web fabricated in accordance with a roll-to-roll process according to embodiments of the invention.

FIG. 7 shows an apparatus for producing an MEA web and discrete MEAs from the MEA web fabricated in accordance with a roll-to-roll process according to embodiments of the invention. The apparatus illustrated in FIG. 7 is configured to sequentially process first and second surfaces of a web of subgasketed CCM substructures 700a. As is depicted in FIG. 7, a web of subgasketed CCM substructures 700a is transported to a first crosslinkable resin coating module 802 that applies a crosslinkable resin to cover at least the subgasketed portion of the subgasketed CCM substructures 700a. The web is advanced so that the CCM substructures 700b are transported to a first resin curing module 804, where curing of the crosslinkable resin is initiated but not completed. The web is advanced so that the subgasketed CCM substructures 700b provided with the partially cured crosslinkable resin are advanced to a first GDL attachment module 806, where GDLs are moved into adhering contact with respective subgasketed CCM substructures 700b. The web is advanced to a second resin curing module 808, where the crosslinkable resin is subjected to additional curing.

After exiting the second resin curing module 808, the subgasketed CCM substructures 700c are separated from a release liner 801 that supports the subgasketed CCM substructures 700a-c, such as by use of a stripper. The GDLs remain adhered to a release liner 803, which exposes the second surface of the subgasketed CCM substructures 700c. The second surface of the subgasketed CCM substructures 700b is processes in a manner similar to that of the first surface. The subgasketed CCM substructures 700c are transported to a second crosslinkable resin coating module 812 that applies a crosslinkable resin to cover at least the subgasketed portion of the second surface of the subgasketed CCM substructures 700c. The CCM substructures 700d are transported to a third resin curing module 814, where curing of the crosslinkable resin is initiated but not completed. The subgasketed CCM substructures 700d provided with the partially cured crosslinkable resin are advanced to a second GDL attachment module 816, where GDLs are moved into adhering contact with respective subgasketed CCM substructures 700d. The subgasketed CCM substructures 700e are advanced to a fourth resin curing module 818, where the crosslinkable resin is subjected to additional curing. The web of MEA substructures 700e may be converted to discrete MEAs 700f at an MEA converting module 820.

EXAMPLE

Experiments were performed using a UV and thermally curable epoxy formulation as a crosslinkable resin. The formulation was as follows:

| Component | | Parts |
|---|---|---|
| Epon 828 | Epoxy resin | 60 |
| Epon 1001F | High viscosity epoxy resin | 14 |
| Tone 301 | Polyester based polyol | 26 |
| Initiator | Sulfonium salt* | 5 |

*triaryl sulfonium salt photo initiator was obtained from Aceto Corporation, Lake Success New York.

The epoxy was coated onto a 3 mil thick PEN via a Meyer rod coater. The epoxy coating was then exposed to an H-bulb UV light source for various times. After exposure to the light source, a piece of GDL was placed on the coating. The quality of the cure was characterized over time. After three days, the GDL adhesion was characterized. For all samples, the microlayer on the GDL fragmented when removing the GDL from the epoxy, indicating that the adhesive strength of the epoxy is sufficient to attach the GDL. In addition to measuring GDL adhesion after three days, the quality of the epoxy cure under the GDL was characterized before and after placing in an oven at 110 C for 15 minutes. Table 1 below summarizes the results of the experiments.

TABLE 1

| | Sample 1 | Sample 2 | Sample 3 | Sample 4 | Sample 5 |
|---|---|---|---|---|---|
| Set Line Speed, fpm | 10 | 20 | 30 | 40 | 50 |
| Actual line Speed, fpm | 6.5 | 13 | 19.5 | 26 | 32.5 |
| Cure at t = 0 min | 5 | 4 | 3 | 2 | 2 |
| Cure at t ~5 min | | 6 | 3 | 3 | |
| Cure at t ~10 min | 8 | 7 | 6 | 4 | 2 |
| Cure at t ~15 min | 9 | 8 | 7 | | |
| Cure at t ~20 min | 10 | | | | |
| Cure at t ~140 min | 10 | 9 | 8 | 8 | 5 |
| Cure at t ~260 min | 10 | 9 | | 8 | 7 |
| Cure at t ~3 days | 10 | 9 | 9 | 9 | 9 |
| GDL Adhesion | N/A | Samples 2-5: Fragmented microlayer when removing GDL | | | |
| Cure under GDL @ 3 days | | | | | |
| Liner Side | N/A | 9 | 9 | 4 | 4 |
| GDL Side | N/A | 9 | 6 | 4 | 4 |
| Cure ratings after 15 min in 110 C. oven | | | | | |
| Cure under GDL | | | | | |
| Liner Side | N/A | 10 | 9 | 8 | 6 |
| GDL Side | N/A | 10 | 9 | 8 | 6 |

Cure rating scale
10 = Fully cured
5 = Skin on top of coating
1 = No cure

Any suitable electrolyte membrane may be used in the practice of the present invention. Useful PEM thicknesses range between about 200 μm and about 15 μm. Copolymers of tetrafluoroethylene (TFE) and a co-monomer according to the formula: FSO2-CF2-CF2-O—CF(CF3)-CF2-O—CF=CF2 are known and sold in sulfonic acid form, i.e., with the FSO2- end group hydrolyzed to HSO3-, under the trade name NAFION® by DuPont Chemical Company, Wilmington, Del. NAFION® is commonly used in making polymer electrolyte membranes for use in fuel cells. Copolymers of tetrafluoroethylene (TFE) and a co-monomer according to the formula: FSO2-CF2-CF2-O—CF=CF2 are also known and used in sulfonic acid form, i.e., with the FSO2- end group hydrolyzed to HSO3-, in making polymer electrolyte membranes for use in fuel cells. Most preferred are copolymers of tetrafluoroethylene (TFE) and FSO2-CF2CF2CF2CF2-O—CF=CF2, with the FSO2- end group hydrolyzed to HSO3-. Other materials suitable for PEM construction are described in commonly owned U.S. patent application Ser. No. 11/225,690 filed 13 Sep. 2005 which is incorporated herein by reference.

In some embodiments, the catalyst layers may comprise Pt or Pt alloys coated onto larger carbon particles by wet chemical methods, such as reduction of chloroplatinc acid. This form of catalyst is dispersed with ionomeric binders and/or solvents to form an ink, paste, or dispersion that is applied either to the membrane, a release liner, or GDL.

In some embodiments, the catalyst layers may comprise nanostructured support elements bearing particles or nanostructured thin films (NSTF) of catalytic material. Nanostructured catalyst layers do not contain carbon particles as supports and therefore may be incorporated into very thin surface layers of the electrolyte membrane forming a dense distribution of catalyst particles. The use of nanostructured thin film (NSTF) catalyst layers allows much higher catalyst utilization than catalyst layers formed by dispersion methods, and offer more resistance to corrosion at high potentials and temperatures due to the absence of carbon supports. In some implementations, the catalyst surface area of a CCM may be further enhanced by using an electrolyte membrane having microstructured features. Various methods for making microstructured electrolyte membranes and NSTF catalyst layers are described in the following commonly owned patent documents which are incorporated herein by reference: U.S. Pat. Nos. 4,812,352, 5,879,827, and 6,136,412 and U.S. patent application Ser. No. 11/225,690 filed Sep. 13, 2005 and Ser. No. 11/224,879, filed Sep. 13, 2005.

NSTF catalyst layers comprise elongated nanoscopic particles that may be formed by vacuum deposition of catalyst materials on to acicular nanostructured supports. Nanostructured supports suitable for use in the present invention may comprise whiskers of organic pigment, such as C.I. PIGMENT RED 149 (perylene red). The crystalline whiskers have substantially uniform but not identical cross-sections, and high length-to-width ratios. The nanostructured support whiskers are coated with coating materials suitable for catalysis, and which endow the whiskers with a fine nanoscopic surface structure capable of acting as multiple catalytic sites.

The nanostructured support elements are coated with a catalyst material to form a nanostructured thin film catalyst layer. According to one implementation, the catalyst material comprises a metal, such as a platinum group metal. In one embodiment, the catalyst coated nanostructured support elements may be transferred to a surface of an electrolyte membrane to form a catalyst coated membrane. In another embodiment, the catalyst coated nanostructured support elements maybe formed on a GDL surface.

The GDLs can be any material capable of collecting electrical current from the electrode while allowing reactant gasses to pass through, typically a woven or non-woven carbon fiber paper or cloth. The GDLs provide porous access of gaseous reactants and water vapor to the catalyst and membrane, and also collect the electronic current generated in the catalyst layer for powering the external load.

The GDLs may include a microporous layer (MPL) and an electrode backing layer (EBL), where the MPL is disposed between the catalyst layer and the EBL. EBLs may be any suitable electrically conductive porous substrate, such as carbon fiber constructions (e.g., woven and non-woven carbon fiber constructions). Examples of commercially available carbon fiber constructions include trade designated "AvCarb P50" carbon fiber paper from Ballard Material Products, Lowell, Mass.; "Toray" carbon paper which may be obtained from ElectroChem, Inc., Woburn, Mass.; "SpectraCarb" carbon paper from Spectracorp, Lawrence, Mass.; "AFN" non-woven carbon cloth from Hollingsworth & Vose Company, East Walpole, Mass.; and "Zoltek" carbon cloth from Zoltek Companies, Inc., St. Louis, Mo. EBLs may also be treated to increase or impart hydrophobic properties. For example, EBLs may be treated with highly-fluorinated polymers, such as polytetrafluoroethylene (PTFE) and fluorinated ethylene propylene (FEP).

The carbon fiber constructions of EBLs generally have coarse and porous surfaces, which exhibit low bonding adhesion with catalyst layers. To increase the bonding adhesion, the microporous layer may be coated to the surface of EBLs. This smoothens the coarse and porous surfaces of EBLs, which provides enhanced bonding adhesion with some types of catalyst layers.

The foregoing description of the various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What we claim is:

1. A fuel cell membrane electrode assembly (MEA), comprising:
    a catalyst coated membrane (CCM) comprising a first surface and a second surface, the first surface comprising an anode catalyst layer and the second surface comprising a cathode catalyst layer;
    a subgasket, wherein the subgasket is disposed about a peripheral region of the CCM contacting the first surface and the second surface;
    a crosslinked resin provided on at least the subgasket of the first and second CCM surfaces, the crosslinked resin comprising a photocurable cationic crosslinked resin wherein the crosslinkable resin has a latent curing ability; and
    a gas diffusion layer (GDL) adheringly sealed to the subgasket of the first and second CCM surfaces via the crosslinked resin.

2. The assembly of claim 1, wherein the crosslinked resin is a photocurable and thermally curable crosslinked resin.

3. The assembly of claim 1, wherein the crosslinked resin comprises a cationically polymerizable monomer.

4. The assembly of claim 3, wherein the cationically polymerizable monomer comprises an epoxide monomer.

5. The assembly of claim 3, wherein the cationically polymerizable monomer comprises a vinyl ether monomer.

6. The assembly of claim 3, wherein the cationically polymerizable monomer comprises an epoxide monomer and a vinyl ether monomer.

* * * * *